United States Patent
Lee et al.

(10) Patent No.: US 9,329,199 B2
(45) Date of Patent: May 3, 2016

(54) MEMS TILT SENSOR

(71) Applicant: Knowles Electronics, LLC, Itasca, IL (US)

(72) Inventors: Sung Bok Lee, Chicago, IL (US); Eric J. Lautenschlager, Geneva, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 273 days.

(21) Appl. No.: 13/705,722

(22) Filed: Dec. 5, 2012

(65) Prior Publication Data

US 2013/0160547 A1    Jun. 27, 2013

Related U.S. Application Data

(60) Provisional application No. 61/567,337, filed on Dec. 6, 2011.

(51) Int. Cl.
| | |
|---|---|
| *G01P 15/125* | (2006.01) |
| *G01C 9/06* | (2006.01) |
| *G01C 9/14* | (2006.01) |
| *H04R 3/00* | (2006.01) |
| *G01P 15/08* | (2006.01) |
| *H04R 19/00* | (2006.01) |
| *H04R 31/00* | (2006.01) |

(52) U.S. Cl.
CPC ............. *G01P 15/125* (2013.01); *G01C 9/06* (2013.01); *G01C 9/14* (2013.01); *H04R 3/00* (2013.01); *G01C 2009/062* (2013.01); *G01P 2015/0822* (2013.01); *G01P 2015/0857* (2013.01); *H04R 19/005* (2013.01); *H04R 31/00* (2013.01)

(58) Field of Classification Search
CPC .......... H01L 29/82; H04R 3/00; H04R 19/00; H04R 19/01; H04R 19/016; H04R 19/04; H04R 31/00; H04R 19/005; G01P 15/125
USPC ............. 381/122, 174; 33/366.25; 73/514.32, 73/514.28
See application file for complete search history.

(56) References Cited

U.S. PATENT DOCUMENTS

| | | | |
|---|---|---|---|
| 7,825,484 B2 * | 11/2010 | Martin et al. ................. | 381/175 |
| 8,457,332 B2 * | 6/2013 | Loeppert et al. .............. | 381/175 |
| 8,482,524 B2 | 7/2013 | Reinecke | |
| 8,855,337 B2 * | 10/2014 | van Lippen et al. .......... | 381/175 |
| 9,075,426 B2 | 7/2015 | Loeppert | |
| 2010/0172518 A1 * | 7/2010 | Loeppert et al. .............. | 381/122 |
| 2014/0002360 A1 | 1/2014 | Nemeth | |

* cited by examiner

*Primary Examiner* — Helen Kwok
(74) *Attorney, Agent, or Firm* — Fitch, Even, Tabin & Flannery LLP

(57) ABSTRACT

An acoustic sensor includes a back plate; at least one back plate electrode coupled to the back plate; a proof of mass with the proof of mass elastically coupled to the back plate; and a proof of mass electrode coupled to the proof of mass. Movement of the sensor causes a capacitance between the proof of mass electrode and the at least one back plate electrode to vary and the capacitance represents a magnitude of the movement of the sensor.

12 Claims, 6 Drawing Sheets

MEMS TILT SENSOR

CROSS REFERENCE TO RELATED APPLICATIONS

This patent claims benefit under 35 U.S.C. §119 (e) to U.S. Provisional Application No. 61/567,337 entitled "MEMS Tilt Sensor" filed Dec. 6, 2011, the content of which is incorporated herein by reference in its entirety.

TECHNICAL FIELD

This patent relates to MEMS devices and, more specifically, to MEMS assemblies that integrate multiple sensors including tilt sensing and microphone elements.

BACKGROUND OF THE INVENTION

Various microsensors have been used through the years in automotive and consumer electronics. Typically, a single sensor is housed together with necessary electronics in a packaging or in an assembly. Microsensors are typically characterized by their small size. For example, in microphones, the sensing parts have typical dimensions in the millimeter to sub-millimeter length.

Various types of microphones have been used in consumer electronics, including condenser microphones and MEMS microphones. In addition, tilt or orientation sensors have recently seen various implementations in consumer electronic devices. These tilt sensors are typically capacitive devices which are low resolution accelerometers that respond to the force of gravity and provide a voltage or current representative of the orientation or acceleration of the sensor.

Previous accelerometers used as tilt or orientation sensors have typically been surface micro-machined MicroElectro-Mechanical System (MEMS) devices comprising thick layers of polysilicon, typically on the order of several microns, to form the inertial or moving mass member and associated electrodes. These devices are generally not compatible for assembly with a microphone to form a miniature multipurpose device due to the largeness of their die size. In order to house a tilt sensor with a microphone to form a single miniature device it is desirable that the tilt sensor be as small, or smaller, than the microphone die.

BRIEF DESCRIPTION OF THE DRAWINGS

For a more complete understanding of the disclosure, reference should be made to the following detailed description and accompanying drawings wherein.

Figure 1:
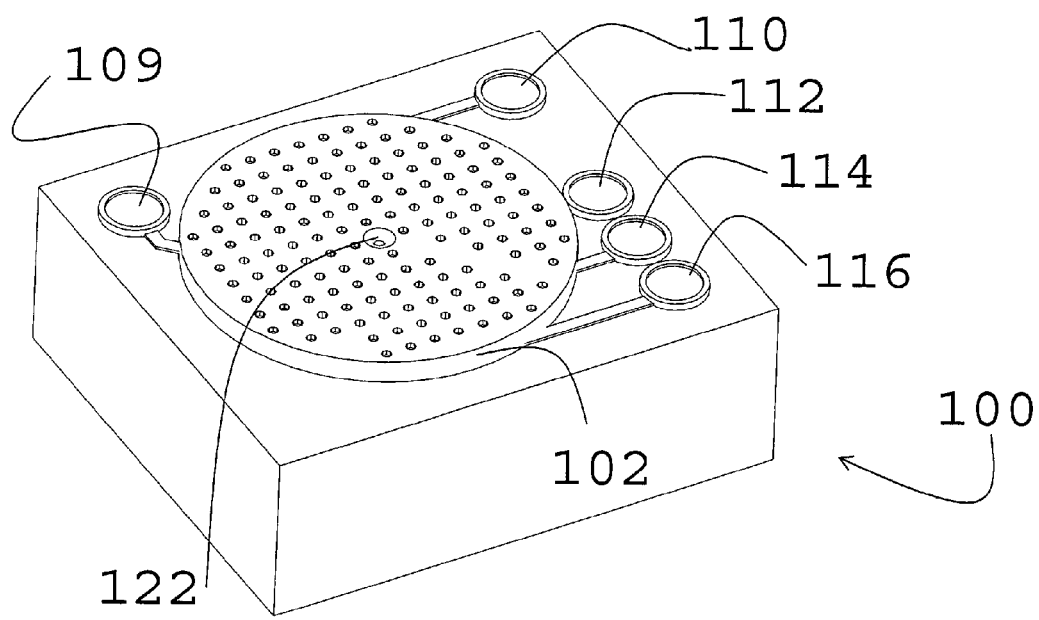
FIG. 1 comprises a perspective view of a tilt sensor according to various embodiments of the present invention.
Figure 2:
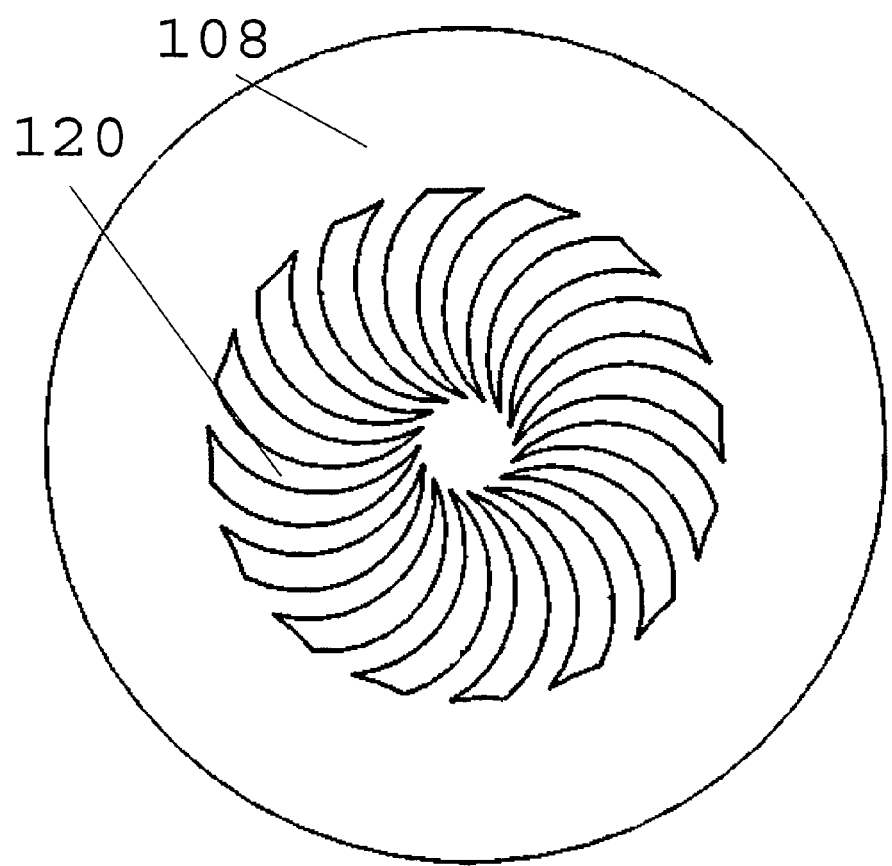
FIG. 2 comprises a top view of a spring used in tilt sensor of FIG. 1 according to various embodiments of the present invention.
Figure 3:
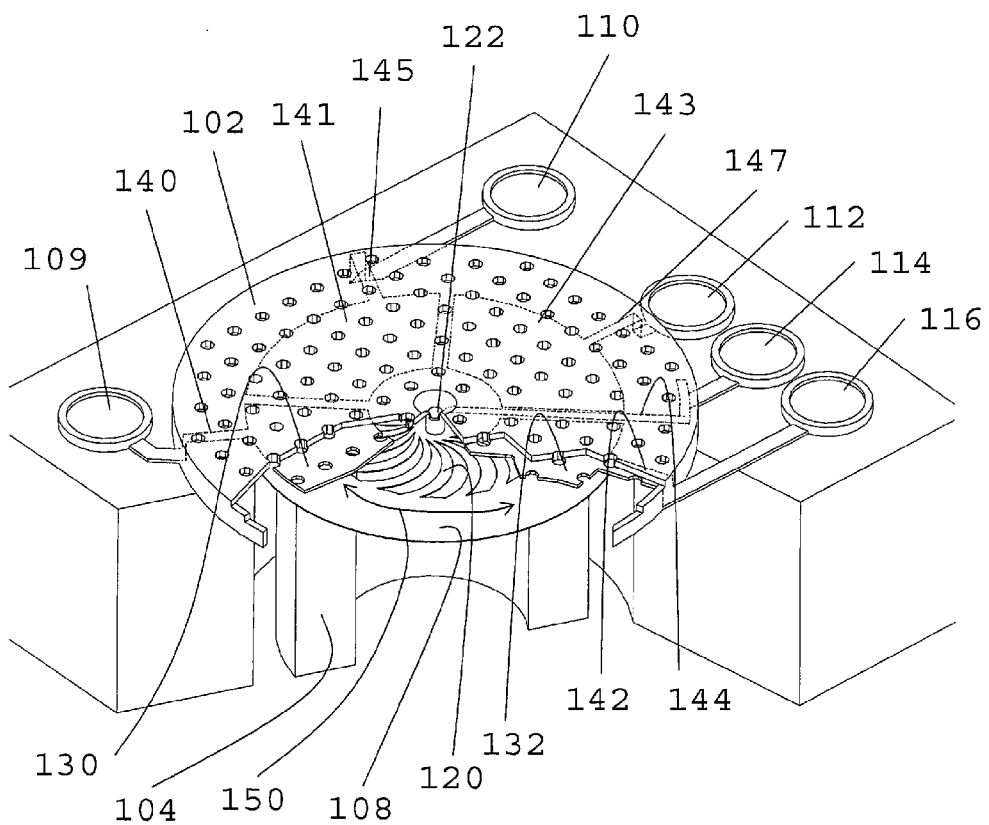
FIG. 3 comprises a perspective cutaway view of the tilt sensor of FIG. 1 and FIG. 2 according to various embodiments of the present invention.
Figure 4:
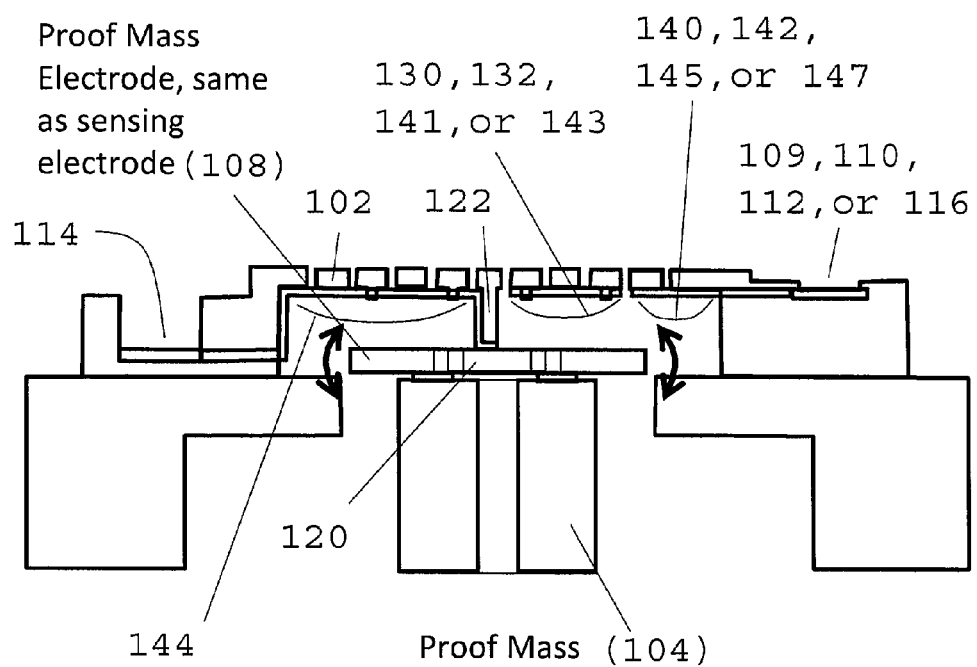
FIG. 4 comprises a side cutaway view of the tilt sensor of FIGS. 1-3 according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

A MicroElectroMechanical System (MEMS) tilt sensor is provided that integrates components of a microphone and is a device that is easily manufacturable. The approaches provided are cost effective to manufacture and provide devices that are small so as to fit into a variety of different assemblies including assemblies with other sensing devices.

In some of these embodiments, an acoustic sensor includes a back plate; at least one back plate electrode coupled to the back plate; a proof of mass with the proof of mass elastically coupled to the back plate; and a proof of mass electrode coupled to the proof of mass. Movement of the sensor causes a capacitance between the proof of mass electrode and the at least one back plate electrode to vary and the capacitance represents a magnitude of the movement of the sensor.

In some aspects, the proof of mass is coupled to the back plate via a spring. In other aspects, the proof of mass is generally cylindrical in shape. In still other aspects, the proof of mass has a configuration such as a hollow configuration or a solid configuration. Other examples are possible.

In other aspects, the capacitance represents at least one of a pitch of the back plate, a roll of the back plate, or a yaw of the back plate. In some examples, the sensor is disposed in a device such as a personal computer, a cellular phone, a personal music player, a digital still camera, a digital video camera, a voice recorder, or a remote control unit. Other examples of devices are possible. In some aspects, the measured capacitance is utilized by an application program in these or other devices.

Referring to FIGS. 1-4, one example of an integrated tilt sensor 100 is described. The sensor 100 includes a back plate 102, a proof mass 104, a proof mass electrode 108 (coupled to a proof mass electrode pad 114 via a connector 144), a first back plate electrode pad 109 coupled to a first back plate electrode 130 via a connector 140 and under the backplate 102, a second back plate electrode pad 110 coupled to a second back plate electrode 141 via a connector 145 and under the back plate 102, a third back plate electrode pad 112 coupled to a third back plate electrode 143 via a connector 147 and under the back plate 102, and a fourth back plate electrode pad 116 coupled to a fourth back plate electrode 132 by a connector 142. The proof mass electrode 108 is coupled to the proof mass 104 while the other electrodes are coupled to the back plate 102. A polysilicon layer includes the sensing proof mass electrode 108. The proof mass 104 is coupled to the back plate 102 via a spring 120. A boss 122 on the back plate 102 is attached to the spiral spring 120. The spiral spring 120 connects the proof mass 104 to the back plate 102 at the boss 122.

The back plate 102 may or may not be charged like the charge plate used in MEMS microphone systems as known to those skilled in the art. The proof mass 104 is a cylinder (or other suitable shape) that may or may not be hollow and in this example is approximately 500 microns in diameter. The proof mass 104 may be constructed from silicon in one example and may weigh approximately 0.2 mg. Other examples of dimensions and construction materials are possible.

The proof mass electrode 108, first back plate electrode 130, second back plate 141 electrode, third back plate electrode 143, and fourth back plate electrode 132 are electrical conductors that couple to either a portion of the back plate or the proof mass. In one example, the electrodes are constructed of a conductor such as a highly doped polysilicon. Other materials may also be used. The electrodes are disposed in a sensing area 150.

The polysilicon layer is a layer of conducting material and this layer includes the sensing electrode 108. The sensing electrode 108 moves when the die is tilted. The spiral spring 120 connects the proof mass 104 to the back plate 102 via a boss 122. The spiral spring 120 may be constructed of highly doped polysilicon. Other construction materials are possible.

In one example of the operation of the system of FIGS. 1-4, the tilting of the back plate 102 moves the proof mass 104 which changes the distance between the proof mass electrode 108 and one or more of the back plate electrodes 130, 132, 141, 143. This change in distance represents and causes a change in capacitance between one or more of the back plate electrodes 130, 132, 141, 143 and the proof mass electrode 108. It will be appreciated that the electrodes 108, 130, 132, 141, 143 may be disposed in any convenient pattern and that the pattern shown in FIGS. 1-4 is one example only. In one aspect, the capacitance may be measured in a separate integrated circuit from signals received from the electrodes.

The sensing electrode 108 connects the proof mass 104 to the spiral spring 120. The center of the spiral spring 120 is connected to the boss 122 of the backplate. Sensing electrode 108 moves relative to the back plate 102 (e.g., the sensing electrode 108 tilts, yaws, and rolls, and so forth). The back plate electrodes 130, 132, 141, 143 are attached to the back plate 102. The change in capacitance will be measured and will be potentially different as between each of the back plate electrodes 130, 132, 141, 143 and the proof mass electrode 108. In one aspect, a particular combination of capacitances represents a predetermined position of the back plate 102 relative to the proof mass electrode 108. Thus, the pitch and yaw of the back plate 102 can be measured as the distance (and thereby the capacitance) changes between the proof mass electrode 108 and one or more of the back plate electrode 130, 132, 141, 143. This can be used by an application program coupled to the above-described sensing arrangement and the program can take various actions (e.g., move an image on a display screen) based upon the determined position. In other example, an acceleration of the back plate 102 can be determined (e.g., the sensor acts as an accelerometer) and this can be used to perform various actions as mentioned above).

Figure 5A:
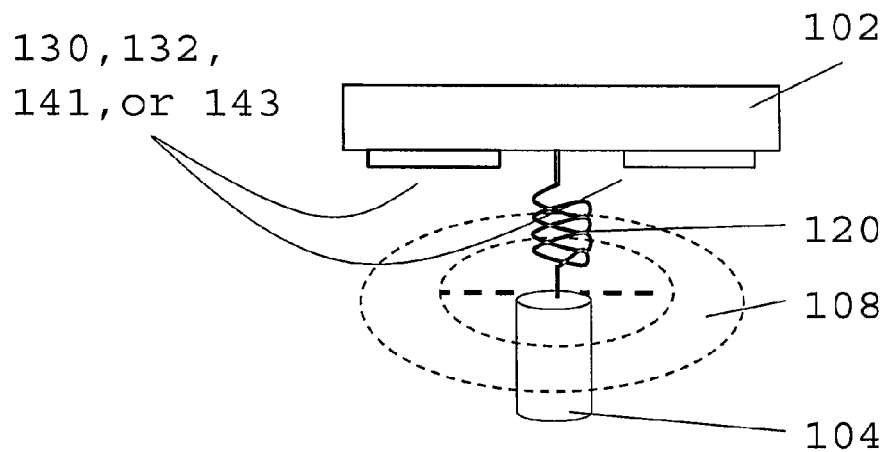
FIG. 5A and FIG. 5B comprise diagrams showing the operation of the tilt sensor of FIGS. 1-4 according to various embodiments of the present invention.
Figure 5B:
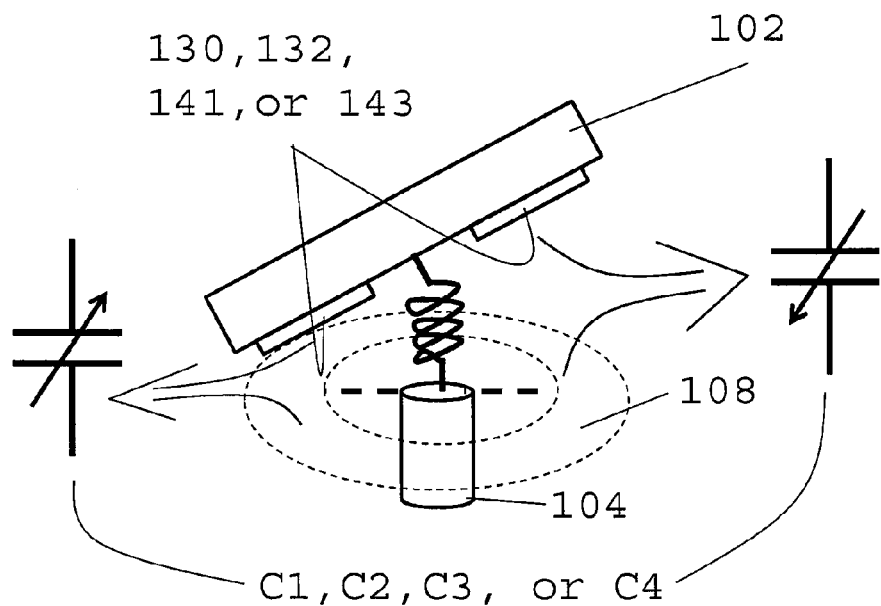

FIG. 5A and FIG. 5B are meant to be a simplified description of the operation of the tilt sensor. These drawings show that as the back plate 102 is tilted in relation to the center of the earth, the proof mass 104 tilts relative to the backplate and relative distances between the sensing electrode 108 connected to the proof mass 104 and the backplate electrodes 130, 132, 141, 143 change resulting in changes in distances and hence capacitances (C1, C2, C3, C4) between the sensing electrode 108 and backplate electrodes 130, 132, 141, 143.

Figure 6:
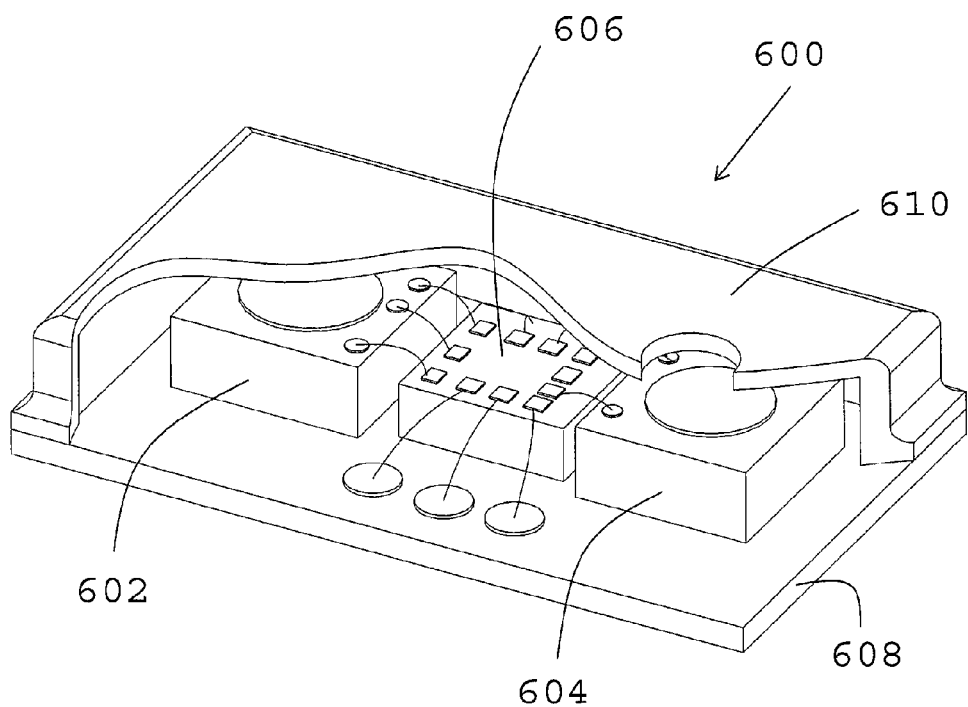
FIG. 6 comprises a view of a microphone and tilt sensor assembled together in one assembly or package according to various embodiments of the present invention.

Referring now to FIG. 6, an integrated microphone and tilt sensor 600 is formed on one assembly and this arrangement is integrated into another device such as a cellular phone or personal computer. The integrated sensor assembly can be installed on an interior circuit board. When the cellular phone is tilted about one or more of the X, Y, or Z axis, the respective output of the corresponding tilt sensor would change as measured by the change in capacitances (as described above). The application program running in the cellular phone, which is in connection with signals from the sensors, would then rotate the information shown on the screen. Any hand held appliance with a display could take advantage of this functionality. Benefit would particularly arise when these appliances also include an audio feature that requires a microphone. Devices contemplated include, but are not limited to, personal music players, digital still cameras, digital video cameras, voice recorders, remote control units, and similar devices.

As shown in FIG. 6, the assembly 600 includes a tilt sensor 602 (as has been described elsewhere herein), a MEMS microphone 604, and an integrated circuit 606 all disposed on a substrate/base 608 and enclosed in a housing 610. The relative location of each component with respect to others may differ from that shown in FIG. 6. The integrated circuit 606 may be a chip that receives the signal from the MEMS microphone 604 and tilt sensor 602. The assembly 600 may be disposed in another device such as a cellular phone or computer. The purpose of the circuit 606 is to condition signals from the tilt sensor die 602 as well as the microphone die 604 and interface with the device that the assembly 600 is located in (e.g., an application program in a cellular phone) for various purposes. In operation, the microphone 604 performs sound detection functions and the tilt sensor determines the tilt angle of the assembly 600. The tilt angle can be used by the circuit 606 or the device the assembly is located in (e.g., an application program in a cellular phone) for various purposes.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An acoustic apparatus, the apparatus comprising:
a back plate that is selectively charged, the back plate having a plurality of openings extending therethrough;
at least one back plate electrode coupled to the back plate;
a proof of mass, the proof of mass elastically coupled to and hanging from the back plate in a vertical position;
a proof of mass electrode coupled to the proof of mass;
wherein movement of the apparatus causes a capacitance between the proof of mass electrode and the at least one back plate electrode to vary, the capacitance representing a magnitude of the movement of the apparatus;
wherein movement of the apparatus causes a tilt of the back plate while the proof of mass substantially maintains the vertical position.

2. The apparatus of claim 1 wherein the proof of mass is coupled to the back plate via a spring.

3. The apparatus of claim 1 wherein the proof of mass is generally cylindrical in shape.

4. The apparatus of claim 1 wherein the proof of mass has a configuration selected from the group consisting of: a hollow configuration and a solid configuration.

5. The apparatus of claim 1 wherein the capacitance represents at least one of a pitch of the back plate, a roll of the back plate, or a yaw of the back plate.

6. The apparatus of claim 1 wherein the apparatus is disposed in a device, the device selected from the group consisting of a personal computer, a cellular phone, a personal music player, a digital still camera, a digital video camera, a voice recorder, and a remote control unit.

7. The apparatus of claim 1 wherein the capacitance is transmitted to an application program.

8. An microphone assembly comprising:
a substrate;
a housing coupled to the substrate;
a MEMS microphone disposed on the substrate and enclosed in the housing;
an integrated circuit disposed on the substrate, enclosed in the housing, and coupled to the MEMS microphone;
a tilt sensor disposed on the substrate, enclosed in the housing, and coupled to the integrated circuit, the tilt sensor comprising:
  a back plate that is selectively charged, the back plate having a plurality of openings extending therethrough;
  at least one back plate electrode coupled to the back plate;
  a proof of mass, the proof of mass elastically coupled to and hanging from the back plate in a vertical position;
  a proof of mass electrode coupled to the proof of mass;
  wherein movement of the sensor causes a capacitance between the proof of mass electrode and the at least one back plate electrode to vary, the capacitance representing a magnitude of the movement of the sensor;
  wherein movement of the sensor causes a tilt of the back plate while the proof of mass substantially maintains the vertical position,
wherein the capacitance is communicated to the integrated circuit for further processing.

9. The microphone assembly of claim 8 wherein the proof of mass is coupled to the back plate via a spring.

10. The microphone assembly of claim 8 wherein the proof of mass is generally cylindrical in shape.

11. The microphone assembly of claim 8 wherein the proof of mass has a configuration selected from the group consisting of: a hollow configuration and a solid configuration.

12. The microphone assembly of claim 8 wherein the capacitance represents at least one of a pitch of the back plate, a roll of the back plate, or a yaw of the back plate.

* * * * *